United States Patent [19]

Achille

[11] Patent Number: 4,488,843
[45] Date of Patent: Dec. 18, 1984

[54] REUSABLE ONE PIECE DRIVE FASTENER

[75] Inventor: Jean R. Achille, Forest Park, Ill.

[73] Assignee: Illinois Tool Works Inc., Chicago, Ill.

[21] Appl. No.: 399,034

[22] Filed: Jul. 16, 1982

[51] Int. Cl.³ ............................................. F16B 13/08
[52] U.S. Cl. ...................................... 411/41; 411/60;
411/72; 411/385
[58] Field of Search .................................. 411/39–41,
411/57, 60, 72, 77, 61, 385, 394, 908

[56] References Cited

U.S. PATENT DOCUMENTS

| | | | |
|---|---|---|---|
| 3,456,547 | 7/1969 | Strong | 411/385 |
| 3,918,130 | 11/1975 | Poe | 411/41 |
| 4,085,651 | 4/1978 | Koscik | 411/41 |

FOREIGN PATENT DOCUMENTS 857142 11/1952 Fed. Rep. of Germany ........ 411/72

Primary Examiner—Gary L. Smith
Assistant Examiner—Neill Wilson
Attorney, Agent, or Firm—Thomas W. Buckman; John P. O'Brien

[57] ABSTRACT

A fastener is disclosed which is installed quickly and easily the first time by simply driving a frangible drive pin. The drive pin has ribs which cooperate with grooves in an axially extending bore in the fastener body to limit distortion of the fastener due to rotational stresses imparted thereto by a tool engaging the head of the fastener. Subsequent to the initial installation of the fastener by the driving of the frangible drive pin the fastener is reusable in the same manner as a conventional threaded fastener.

4 Claims, 9 Drawing Figures

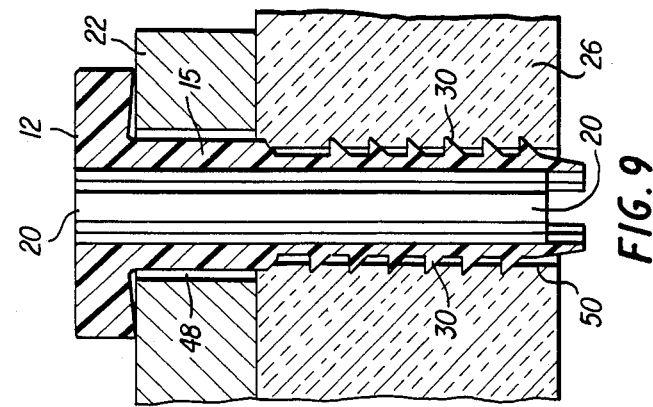
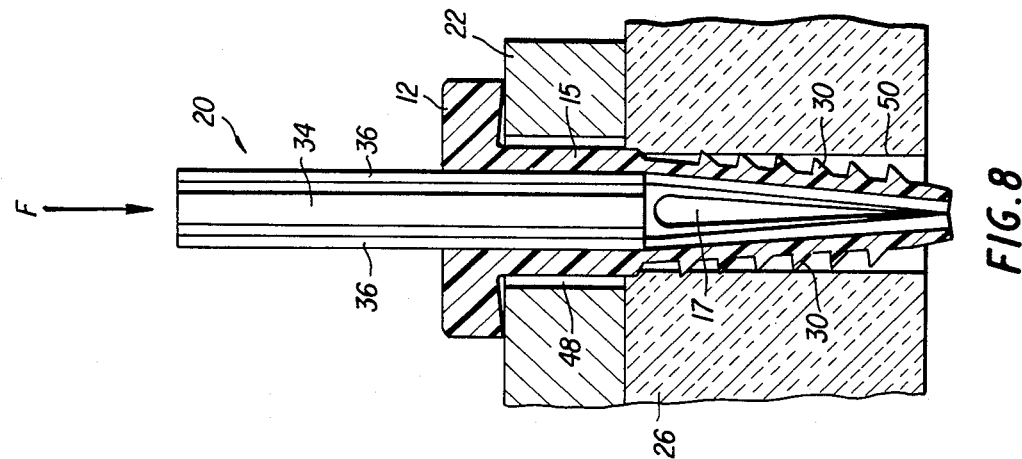
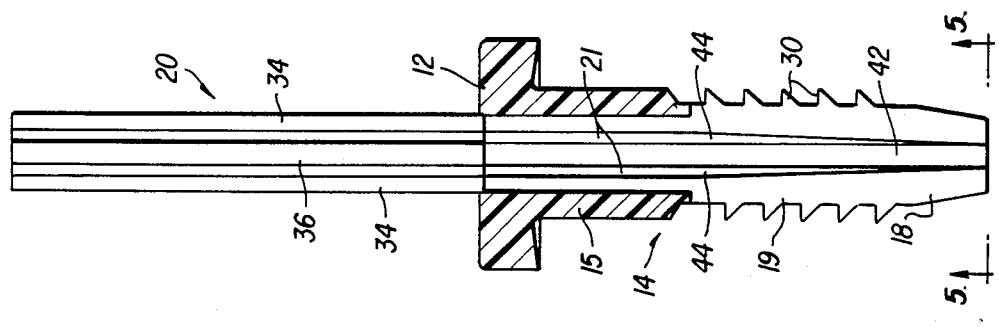
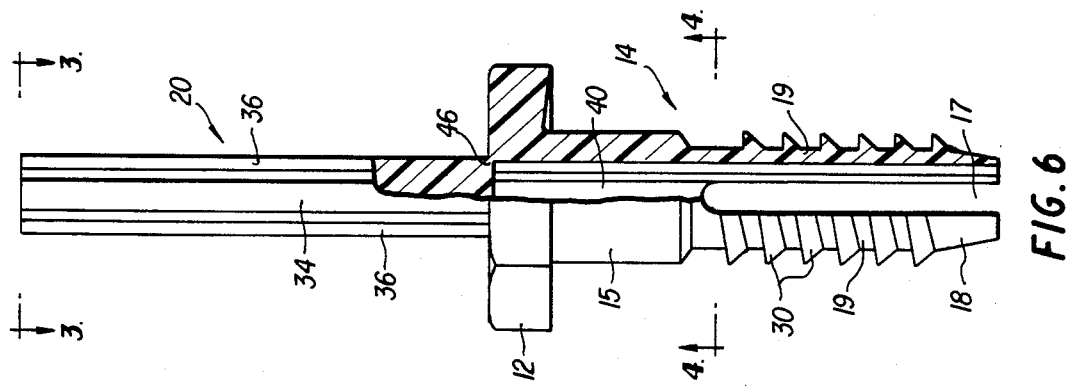

REUSABLE ONE PIECE DRIVE FASTENER

BACKGROUND OF THE INVENTION

There are many examples of rivet-like devices in the prior art having a head with two or more depending shank portions. The shank portions are generally insertable through an apertured workpiece and expanded by a drive pin which is inserted into a bore that passes through the head and shank portion of the device. A common problem in earlier versions is that the devices are not reusable, or if, as in some cases, they are reusable the integrity of the device is modified rendering it more difficult to use and less effective in its retention. Examples of prior art approaches to the problem of a reusable expandable fastener include U.S. Pat. No. 4,263,833, which shows a frangible threaded pin driven into the fastener by an axial blow and thereafter removable by a rotary force being applied thereto. To remove the fastener of this particular patent requires prior removal of the threaded pin. Another approach to this problem is shown in U.S. Pat. No. 3,411,397 wherein a drive pin is driven into a bifurcated fastener and the drive pin is rotatable within the fastener from a latch position to a release position to thereby permit the bifurcated portions of the shank to relax inwardly and permit the fastener to be withdrawn from the aperture. Another prior art device is shown in U.S. Pat. No. 3,765,295 wherein a frangible drive pin is driven into a fastener having a bifurcated shank portion, the shank portion including external ribs for engaging the walls of an aperture.

None of the prior art devices show a reusable fastener having a bifurcated or split shank where the drive pin, when driven into the fastener, will inhibit movement of the shank portions relative to one another, when the fastener is rotated. The prior art primarily relied upon destruction of the rivet for its removal or; in the instance of the Loudin patent removal of the fastener required the removal of the threaded drive pin.

SUMMARY OF THE INVENTION

The present invention is designed to overcome the principal disadvantage of conventional rivets as they relate to the problem of removability and reusability. A principal advantage of the present invention is that in its first usage the fastener is simply installed by inserting the shank portion of the fastener in registered apertures and driving the frangible drive pin. Subsequent usage of the fastener being accomplished by engagement of the head by a tool. To either retract the installed fastener from the aperture or to reinstall a used fastener, a conventional tool is used to impart a rotational force. Another advantage of the device being that once the drive pin is driven the fastener is more or less unitary and from that time on handled as a one piece part.

A further advantage of the present invention is found in the grooved configuration on the interior bore of the fastener head and bifurcated shank and the complimentary rib structure on the drive pin. When the drive pin is subjected to an axial blow thereby seating the pin within the bore the complimenting ribs and grooves co-act to prevent rotational distortion of the bifurcated portions. The co-action of the ribs and grooves principally meaning that the device may have rotational energy imputed to it without distortion of the externally threaded bifurcated portions.

A secondary advantage of the device being that during the initial installation of the device in an apertured panel the device may need to be securely tightened further by the input of rotational energy. This is readily accomplished by the engagement of a tool with the head of the fastener and the inducement of forces therein.

The objects of this invention include overcoming the shortcomings of the prior art devices by setting forth a fastener which accomplishes the advantages as set forth above.

The present invention has, as its primary object, the provision of a plastic fastener or rivet, of the character described, in which the expander pin is so connected with the head and so interacts with the bifurcated shank portions to inhibit rotational distortion of the shank portion when a tool is engaged with the head portion of the fastener and rotational energy is imparted thereto.

Another object of the invention is to provide a plastic fastener or rivet, of the character described, in which the expander pin is of a particular configuration and is so connected with the head to greatly facilitate the breaking or shearing of the connection with the head when subjected to an axial blow.

A further object of the invention is to provide a plastic fastener or rivet, of the character described, in which the interaction of the expander pin with the bifurcated shank portion and the head is unique and which readily lends itself to manufacture by conventional molding processes using conventional molding machinery.

Other objects and advantages of the instant invention will be apparent during the course of the following description of the preferred embodiment.

The accompanying drawings forming a part of this specification, in which like numerals are employed to designate like parts throughout the same, are referred to herein in the description of the preferred embodiment.

FIG. 6 shows the fastener of the instant invention in partial section;

FIG. 7 is the fastener as shown in FIG. 6 rotated 90°, in partial cross-section showing the internal groove structure of the fastener head and shank;

FIG. 8 shows the fastener of FIG. 6 with the head and shank in partial cross section and the drive pin partially driven;

FIG. 9 shows the fastener of FIG. 8 in cross section with the drive pin fully driven and the external threading of the bifurcated shank portion embedded in the walls in the interior of one of the registered apertures.

DETAILED DESCRIPTION OF THE PREFERRED EMBODIMENT

Figure 1:
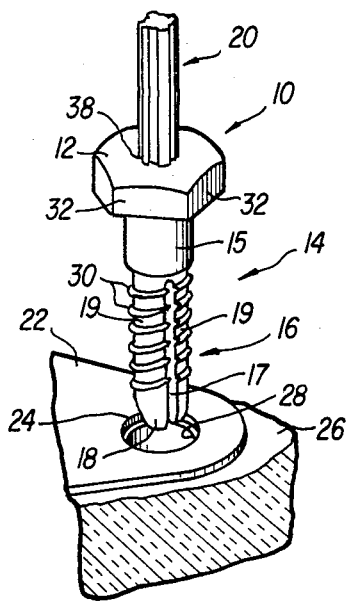
FIG. 1 is a perspective view of the preferred embodiment of the instant invention in relation to registered apertures of a pair of pre-apertured articles.
Figure 3:
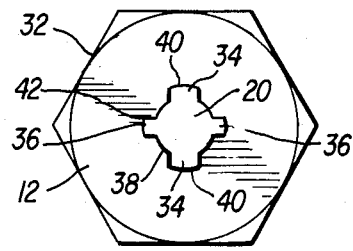
FIG. 3 is a plan view of the head taken in the direction of lines 3—3 in FIG. 6.
Figure 4:
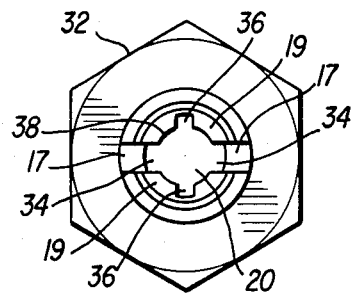
FIG. 4 is a cross sectional view of the shank portion of the fastener taken in the direction of lines 4—4 in FIG. 6.

The present invention is directed to overcoming the principle disadvantages of conventional rivets, namely the problem of ready removal and reusability. The fastener as disclosed herein provides for a very easy initial attachment by driving the frangible drive pin between the bifurcated legs of the threaded shank portion. When removal is desired the head of the fastener is engaged by a conventional tool and axially rotated in the manner of a conventional screw. Once removal of the fastener has been effected it may be reused as a unitary conventional screw would be reused. Important in its ability to be reused is the cooperation of the internal groove structure communicating with the bore passing through the head and the bifurcated shank with the rib structure on the frangible drive pin. The drive pin, ribs, and the grooves of the bore cooperate to give the fastener rotational stability and thereby inhibits distortion of the bifurcated portion due to the frictional engagement of the helically disposed threads on the exterior of the shank with the interior walls of the apertured article.

It should be noted that the particular shape of the threads formed on the exterior of the bifurcated shank is not critical to the function and effectiveness of the concept disclosed herein. Likewise the head of the fastener may assume any external shape which may be engaged by a tool for the application of rotational forces thereto. Critical to the performance of the fastener of this invention is the bore which has radially extending grooves along the interior thereof and the ribbed drive pin which cooperates with the grooved bore. Thus the legs of the bifurcated shank are locked relative to one another by the drive pin thereby permitting reuse of the fastener much like a conventional screw.

The fastener of this disclosure is intended to be injection molded of a plastic material with the drive pin molded in a condition where it may be driven by an axial blow imparted thereto. While it is understood that the drive pin of this device is intended to be attached to the head by a frangible section it is contemplated that the drive pin may be a separate part that could be partially pre-driven prior to introduction of the fastener in an apertured workpiece.

Referring now to the drawings wherein similar numerals are utilized to designate similar parts, the present invention can be seen in its preferred form in FIGS. 1-9.

As best seen in FIG. 1, the fastener of the instant invention includes a fastener body designated by the numeral 10. The fastener body includes a shank portion generally designated 14 and a radially extending head 12. The shank 14 includes a cylindrical portion 15 and a bifurcated portion 16, the bifurcated portion being delineated by slot 17 and having externally disposed helical threads 30 thereon. To aid in the insertion, the fastener is generally pointed at its distal end as at 18. It should be noted that the bifurcated portion 16 of the fastener has legs 19, 19. The fastener includes a frangible drive pin 20 integrally molded with the head portion and generally extending axially therefrom oppositely from the direction of the shank portion 14.

Figure 5:
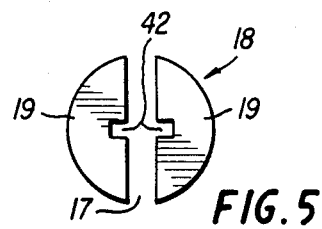
FIG. 5 is a view of the end of the bifurcated shank of the instant fastener.
Figure 2:
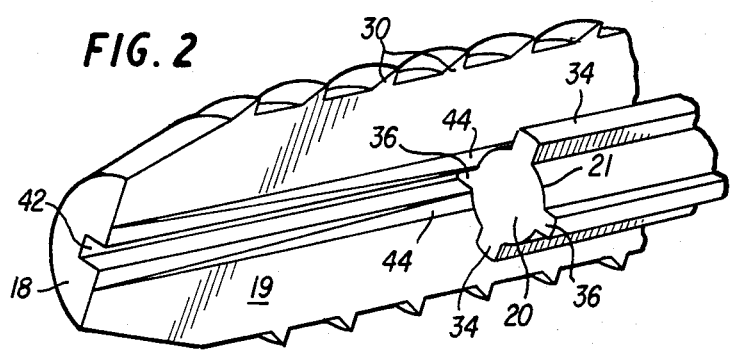
FIG. 2 is a partial view in partial section showing the ribs of the pin relative to one of the legs of the bifurcated shank portion.

Referring now to FIGS. 2-5, it can be seen that the laterally extending head portion is generally hexagonal thereby being adapted to be engaged by a conventional tool for inducing axial rotation in the fastener. The drive pin 20 is substantially cruciform in cross section having a pair of oppositely extending smaller rib portions 36 and a pair of oppositely extending generally larger rib portions 34. The through bore in the device is generally designated as 38 and is complimentary in cross-sectional configuration to the drive pin 20 throughout the length of the bore in the head portion 12 and the cylindrical portion 15 of the shank 14. As can best be seen in FIG. 4 the larger grooves 40 of the bore 38 and the corresponding larger ribs 34 are aligned with the slot 17 in the bifurcated shank portion 16. The smaller grooves 42 which are oppositely extending and equidistantly spaced from the larger grooves 40 are each aligned with a respective leg section 19 of the bifurcated shank portion 16. As best seen in FIGS. 2 and 5, the section of the bore 20 in the bifurcated section 16 begins as complimentary in cross-sectional configuration to the drive pin, including the cylindrical portion 21, and diminishes to the end 18 of the bifurcated portion 16 to where only the smaller groove 42, which is complimentary to the smaller rib 36, remains. As seen in FIG. 2, the bore includes conical segments 44 where the cylindrical portion of the bore in the head 12 and cylindrical shank portion 15 is transitioning until it disappears at the end 18. Thus, as the pin is driven the length of the bore in the fastener to a point where the end of the drive pin is at or near the end of the bifurcated section 16, the drive pin 20 will have forced the bifurcated sections, i.e., legs 19, outwardly to positively engage the helically disposed threads 30 on the exterior of the bifurcated shank section 16 into positive embeddment in the interior wall 50 of the aperture 26. Referring now to FIGS. 6-9, it can be seen that the fastener is depicted as being in its undriven condition, partially driven condition, and fully seated condition. FIG. 6 shows the fastener with the frangible drive pin 20 in an undriven, and in the preferred embodiment, molded condition. FIG. 7 shows the fastener in the same condition only rotated 90° and in partial section to show the bore and communicating smaller groove 42 relative to leg 19. As seen in FIG. 7, the cylindrical section 21 of the bore diminishes along conical bore segments 44 until they disappear near end 18. The fastener as depicted in FIGS. 6 and 7 is inserted in the aligned apertures 24, 28 of the articles, which are intended to be secured together, and the frangible drive pin 20 is then fully driven by an axially blow as depicted by F. As seen in FIG. 8 the drive pin has been driven through the head 12 and the cylindrical section 15 of the shank portion to a point where the cylindrical section 21 of the bore 38 begins to diminish. As seen in FIG. 9 the pin 20 is full driven thereby radially expanding the legs 19 of the bifurcated shank section 16 and forcing the helically formed teeth 30 on the exterior of the shank portion 14 into positive engagement in the interior of the aperture 50.

Referring to the two articles which are intended to be secured together, the first article 22 is depicted as being a face plate having an aperture 24 that is slightly larger than the shank section 14 of the fastener to permit free passage of the fastener therethrough. The second article 26 is depicted as being a speaker cabinet and includes an aperture 28. Aperture 28 is smaller than the aperture 24 in the face plate 22 and receives the fastener bifurcated shank section 16 snuggly therein when it is inserted in its unexpanded condition. Thus, when the drive pin 20 is driven the length of the fastener thereby expanding the bifurcated shank section 16 the teeth 30 are expanded into positive engagement with the walls 50 of the aperture 28.

The principal advantage of the invention clearly is that the fastener can be readily inserted and used the first time by simply pushing the fastener axially through the aligned apertures of the face plate and the cabinet and subsequently driving the frangible drive pin to its seated condition thereby positively engaging the fastener relative to articles. Subsequent usage of the fastener requires the engagement of the head portion by a conventional tool and rotation of the fastener about its longitudinal axis. Removability being caused by axial motion of the fastener which is induced by the helical thread forms engaging with the walls of the aperture 28. To remove the fastener and yet prevent destruction or distortion thereof, the ribs and grooves coact to resist rotational distortion due to frictional stresses caused by the engagement of thread forms with the aperture wall. As the fastener is rotated the smaller ribs are positively engaged in the smaller grooves in the legs and the larger ribs are engaged within the slot thereby essentially creating a unitary fastener which upon its removal may be reused in the same manner as conventional fastener may be reused.

Other embodiments will be apparent to those skilled in the art and variations in sizes and configurations of the bore and drive pin as well as the head and shank sections will be apparent and totally within the purview of the present invention.

The device as described herein above can be formed by injection molding techniques that are well known in the art from suitable plastic materials. Fasteners of this type can be used for securing articles together by simply inserting the fastener in aligned apertures and driving the pin to its seated position. The fastener is then readily removable and reusable in the same manner as a conventional threaded fastener. Therefore, it is intended that all matter contained in the above description or shown in the accompanying drawings shall be interpreted as illustrative and not in a limiting sense.

It is also to be understood that the following claims are intended to cover all of the generic and specific features of the invention herein described.

I claim:

1. A plastic fastener comprising a head, a shank and a drive pin, said head and shank being integrally formed with an axial bore traversing through said head and extending throughout said shank, said shank including a cylindrical portion and a bifurcated portion at the distal end which defines a pair of radially movable leg members separated by a laterally extending slot, helically disposed screw threads on at least a portion of said bifurcated portion, a pair of first grooves formed the length of said head portion and said shank portion in a radially outward direction along said axial bore in alignment with said pair of leg members, a pair of second grooves formed in a radially outward direction along said axial bore through said head and said cylindrical portion and in direct alignment with said lateral slot, said axial bore having a conical configuration along said bifurcated portion which tapers to a smaller cross section towards said distal end, and said drive pin having a length slightly less than the length of said axial bore and having a central body portion with the same uniform cross section along its entire length and of the same shape and slightly smaller size than the portion of said axial bore which traverses through said head and said cylindrical portion of said shank, said drive pin further including a pair of first rib members projecting radially from said central body portion which are located to cooperate in a complementary manner with said pair of first grooves to cause each of said first rib members to ride in a track formed by a respective first groove and a pair of second rib members projecting radially from said central body portion which are located to cooperate in a complementary manner with said lateral slot in said bifurcated portion.

2. A plastic fastener as defined in claim 1, wherein said pair of first grooves and said pair of second grooves are integrally formed with said axial bore to define a cruciform cross-section and wherein said pair of first rib members and said pair of second rib members are integrally formed with said central body portion of said drive pin to define a cruciform cross-section of a slightly smaller size than said first mentioned cruciform cross-section.

3. A fastener as defined in claim 1, wherein said bifurcated portion includes a helically disposed screw threads on at least a portion of the exterior thereof.

4. A fastener as defined in claim 1, wherein said head includes a radially extending flange portion shaped for engagement by a tool whereby rotational forces may be applied to the fastener by a tool.

* * * * *